(12) United States Patent
Chou (10) Patent No.: US 7,445,216 B1
(45) Date of Patent: Nov. 4, 2008

(54) MULTIFUNCTIONAL HANDCART

(75) Inventor: Horng-Ren Chou, Changhua (TW)

(73) Assignee: EHT Worldwide Co., Ltd., Changhua (TW)

( * ) Notice: Subject to any disclaimer, the term of this patent is extended or adjusted under 35 U.S.C. 154(b) by 589 days.

(21) Appl. No.: 11/136,681

(22) Filed: May 24, 2005

(51) Int. Cl.
*B62B 1/12* (2006.01)
*B62B 1/16* (2006.01)
*B62B 3/02* (2006.01)

(52) U.S. Cl. ............... 280/47.26; 280/638; 280/652; 280/40; 280/47.24; 280/47.2; 280/47.19

(58) Field of Classification Search ............. 280/638, 280/652, 40, 47.24, 47.26, 47.2; *B62B 3/02*
See application file for complete search history.

(56) References Cited

U.S. PATENT DOCUMENTS

| | | | | | |
|---|---|---|---|---|---|
| 2,957,700 | A | * | 10/1960 | Beaurline | 280/47.19 |
| 3,997,181 | A | * | 12/1976 | Jaco et al. | 280/47.19 |
| 4,383,695 | A | * | 5/1983 | Ray | 280/47.26 |
| 4,429,897 | A | * | 2/1984 | Friedman et al. | 280/646 |
| 4,896,897 | A | * | 1/1990 | Wilhelm | 280/655 |
| 5,921,574 | A | * | 7/1999 | Driessen et al. | 280/655.1 |
| 6,042,128 | A | * | 3/2000 | Dinkins | 280/47.18 |
| 6,109,627 | A | * | 8/2000 | Be | 280/47.19 |
| 6,176,498 | B1 | * | 1/2001 | Murphy et al. | 280/33.992 |
| 6,203,053 | B1 | * | 3/2001 | Sohrt et al. | 280/641 |
| 6,802,515 | B2 | * | 10/2004 | Sorenson et al. | 280/47.26 |
| 6,802,525 | B2 | * | 10/2004 | Smith | 280/659 |
| 7,334,802 | B2 | * | 2/2008 | Kaplan | 280/47.26 |
| 2005/0275175 | A1 | * | 12/2005 | Murphy et al. | 280/47.26 |

* cited by examiner

*Primary Examiner*—Christopher Ellis
*Assistant Examiner*—Jacob Meyer
(74) *Attorney, Agent, or Firm*—Alan Kamrath; Kamrath & Associates PA (57) ABSTRACT

A multifunctional handcart includes a main body, a telescopically arranged handle assembly retractably mounted on the main body, an adjusting seat adjustably mounted on the handle assembly, and a foldable table pivotally mounted on the adjusting seat. Thus, the table is fully expanded to place a notebook computer so that a user can operate notebook computer easily and conveniently. In addition, the adjusting seat is adjustably mounted on the handle assembly by the screw member to adjust the height of the table so as to fit users of different statures.

15 Claims, 9 Drawing Sheets

MULTIFUNCTIONAL HANDCART

BACKGROUND OF THE INVENTION

1. Field of the Invention

The present invention relates to a handcart, and more particularly to a handcart having multiple functions, thereby enhancing the versatility of the handcart.

2. Description of the Related Art

A conventional handcart comprises a support seat for placing an article, and a plurality of wheels mounted on the bottom of the support seat to facilitate movement of the support seat. However, the conventional handcart is only used to carry an article placed on the support seat so that the handcart only has a single function, thereby greatly limiting the versatility of the handcart. In addition, the support seat has a fixed width, so that the size of the article carried by the conventional handcart is limited.

SUMMARY OF THE INVENTION

In accordance with the present invention, there is provided a handcart, comprising a main body, a telescopically arranged handle assembly retractably mounted on the main body, an adjusting seat adjustably mounted on the handle assembly, and a foldable table pivotally mounted on the adjusting seat.

The primary objective of the present invention is to provide a handcart having multiple functions, thereby enhancing the versatility of the handcart.

Another objective of the present invention is to provide a handcart, wherein the table is fully expanded to place a notebook computer so that a user can operate notebook computer easily and conveniently.

A further objective of the present invention is to provide a handcart, wherein the adjusting seat is adjustably mounted on the handle assembly by the screw member to adjust the height of the table so as to fit users of different statures.

A further objective of the present invention is to provide a handcart, wherein the two side support brackets are expanded outward to increase the width of the basket assembly for placing an article having a larger size.

A further objective of the present invention is to provide a handcart, wherein the support stand is disposed at an inclined state to support the main body and folded into the main body when not in use, thereby facilitating the user operating the handcart.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1-5, a multifunctional handcart in accordance with the preferred embodiment of the present invention comprises a main body 10, a telescopically arranged handle assembly 20 retractably mounted on the main body 10, an adjusting seat 50 adjustably mounted on the handle assembly 20, a foldable table 60 pivotally mounted on the adjusting seat 50, a basket assembly 40 mounted on a first side of the main body 10, a support stand 30 mounted on a second side of the main body 10, and a plurality of wheels 13 rotatably mounted on a bottom of the main body 10.

The main body 10 has an inside formed with a receiving chamber 11 for receiving the handle assembly 20 and the table 60. The first side of the main body 10 is provided with a plurality of transverse mounting tubes 12.

The handle assembly 20 is retractably mounted in and expanded outward from the receiving chamber 11 of the main body 10.

Figure 1:
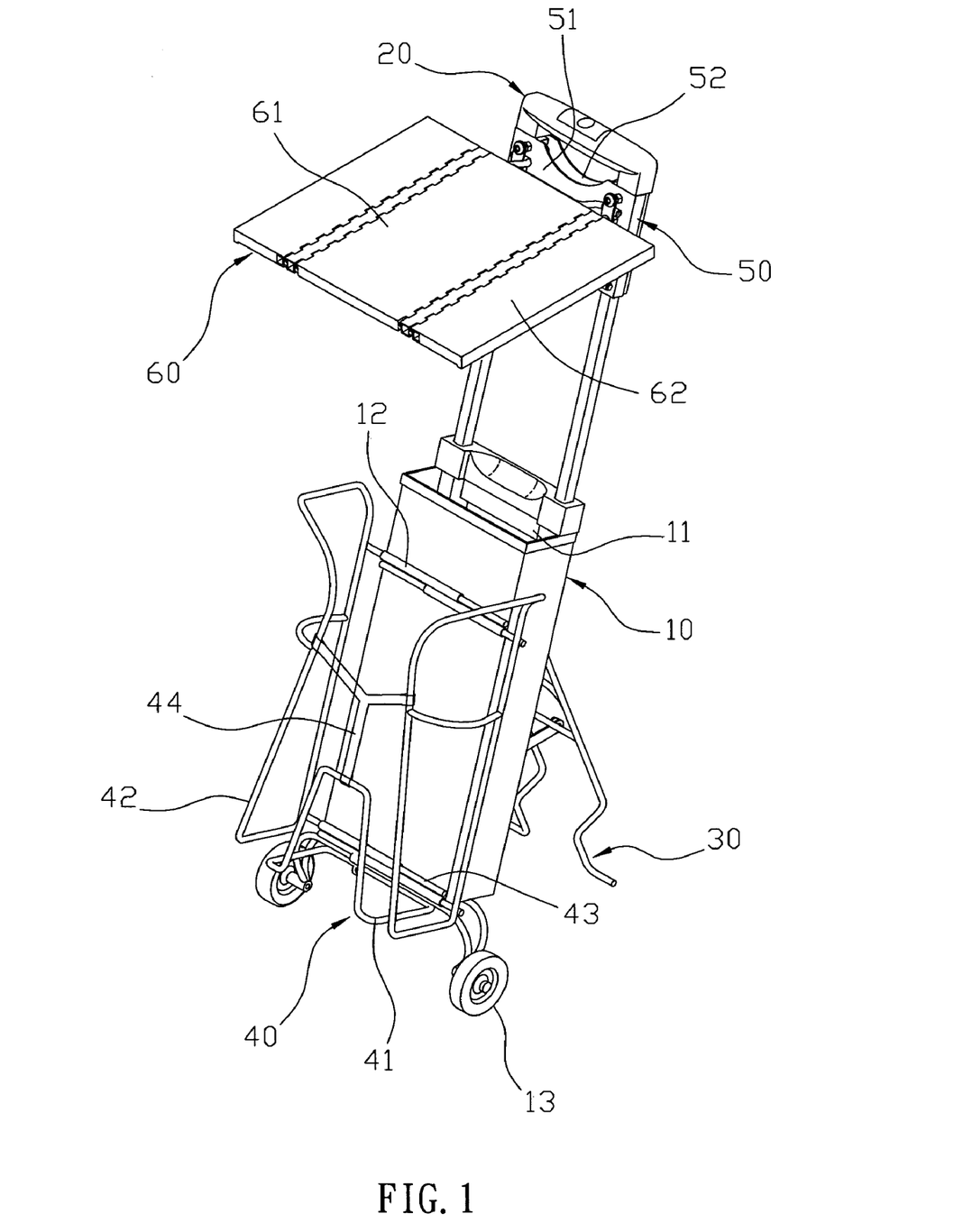
FIG. 1 is a perspective view of a handcart in accordance with the preferred embodiment of the present invention.
Figure 2:
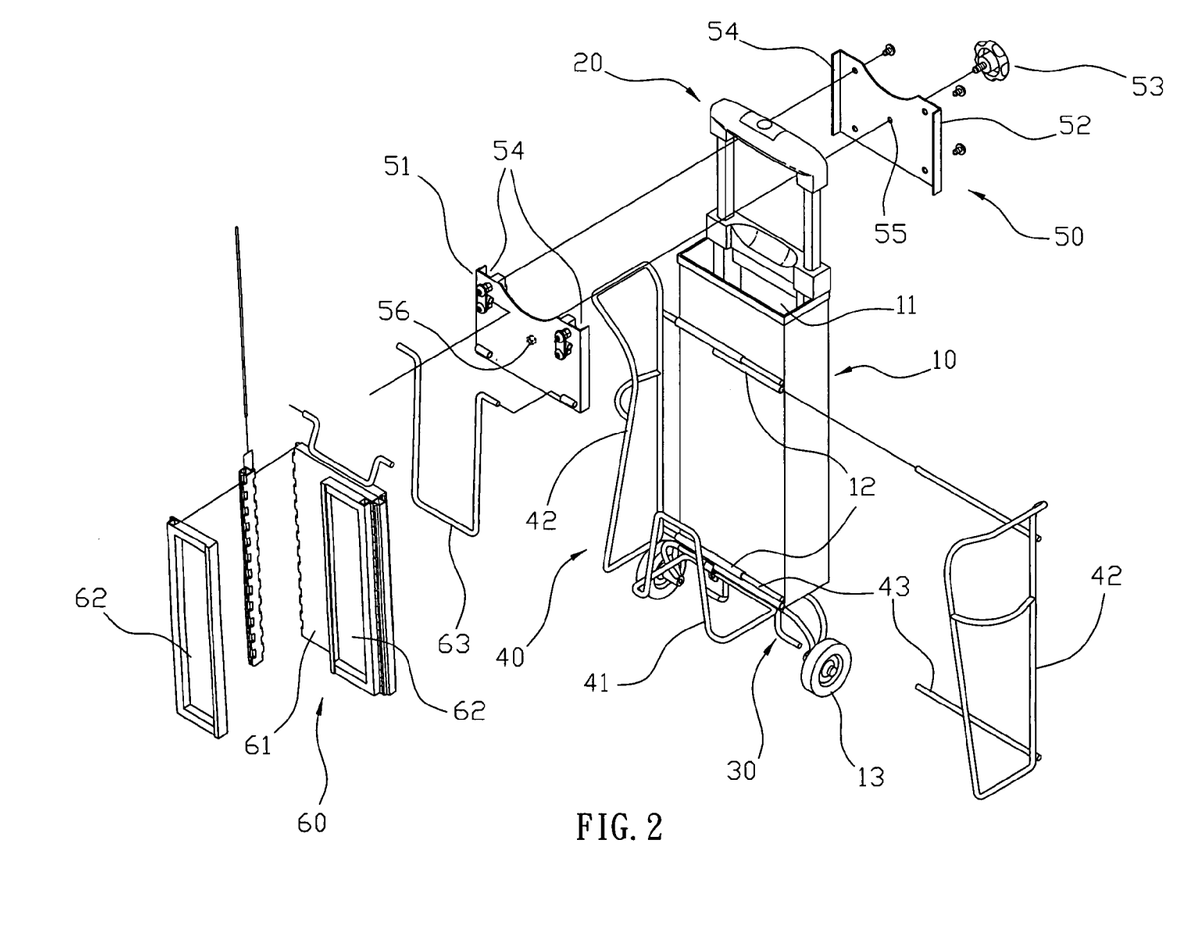
FIG. 2 is an exploded perspective view of the handcart as shown in FIG. 1.
Figure 3:
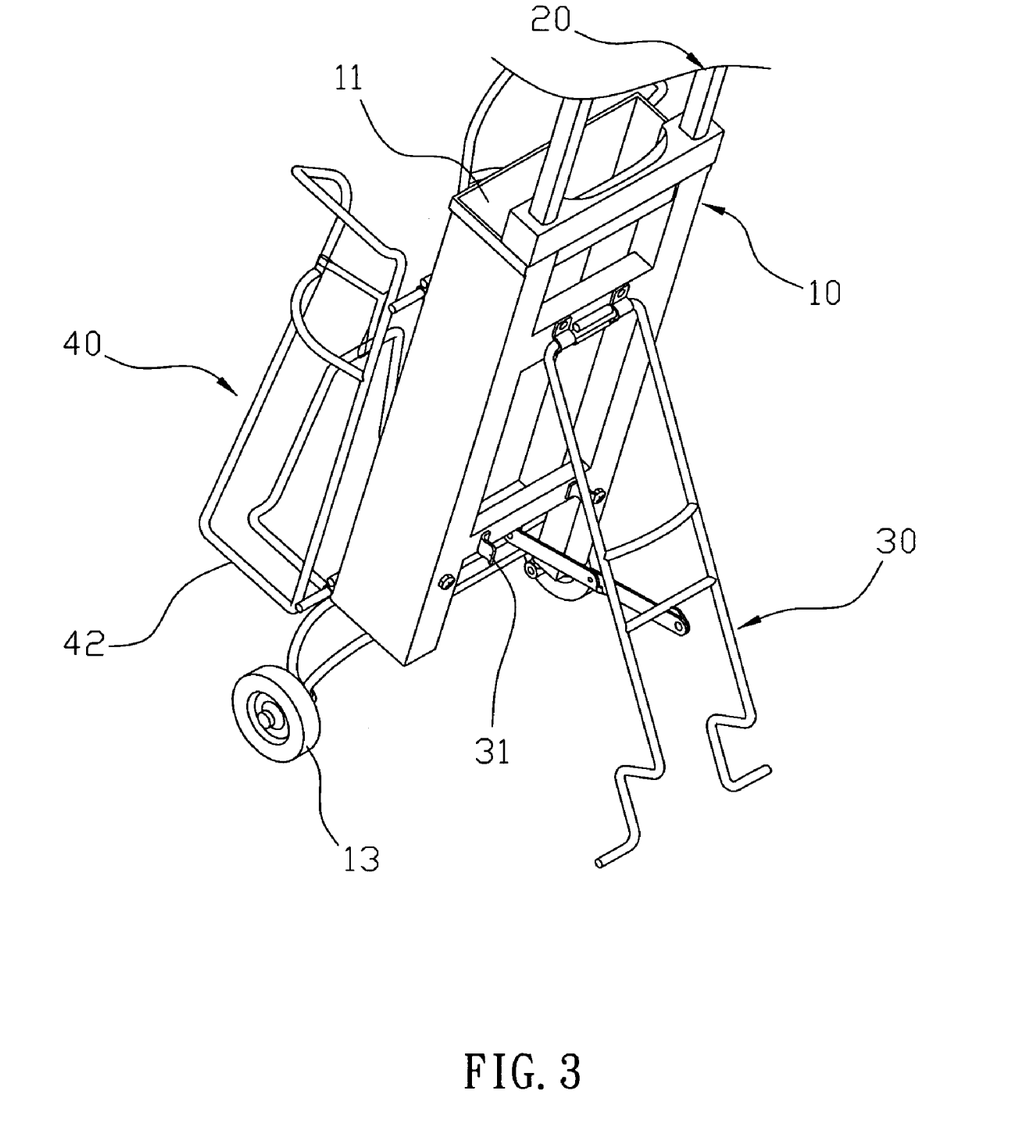
FIG. 3 is a rear perspective view of the handcart as shown in FIG. 1.
Figure 4:
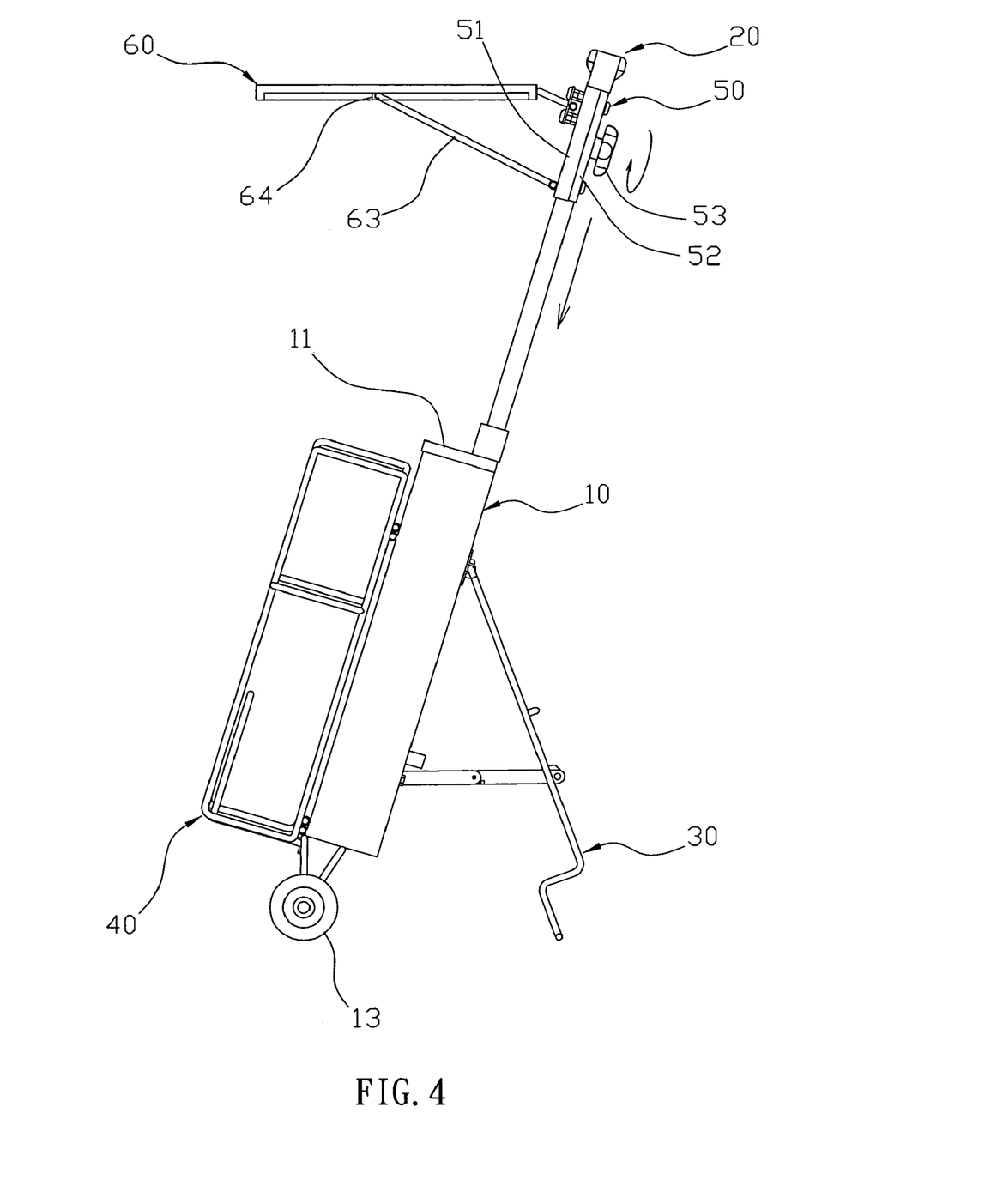
FIG. 4 is a side plan view of the handcart as shown in FIG. 1.
Figure 5:
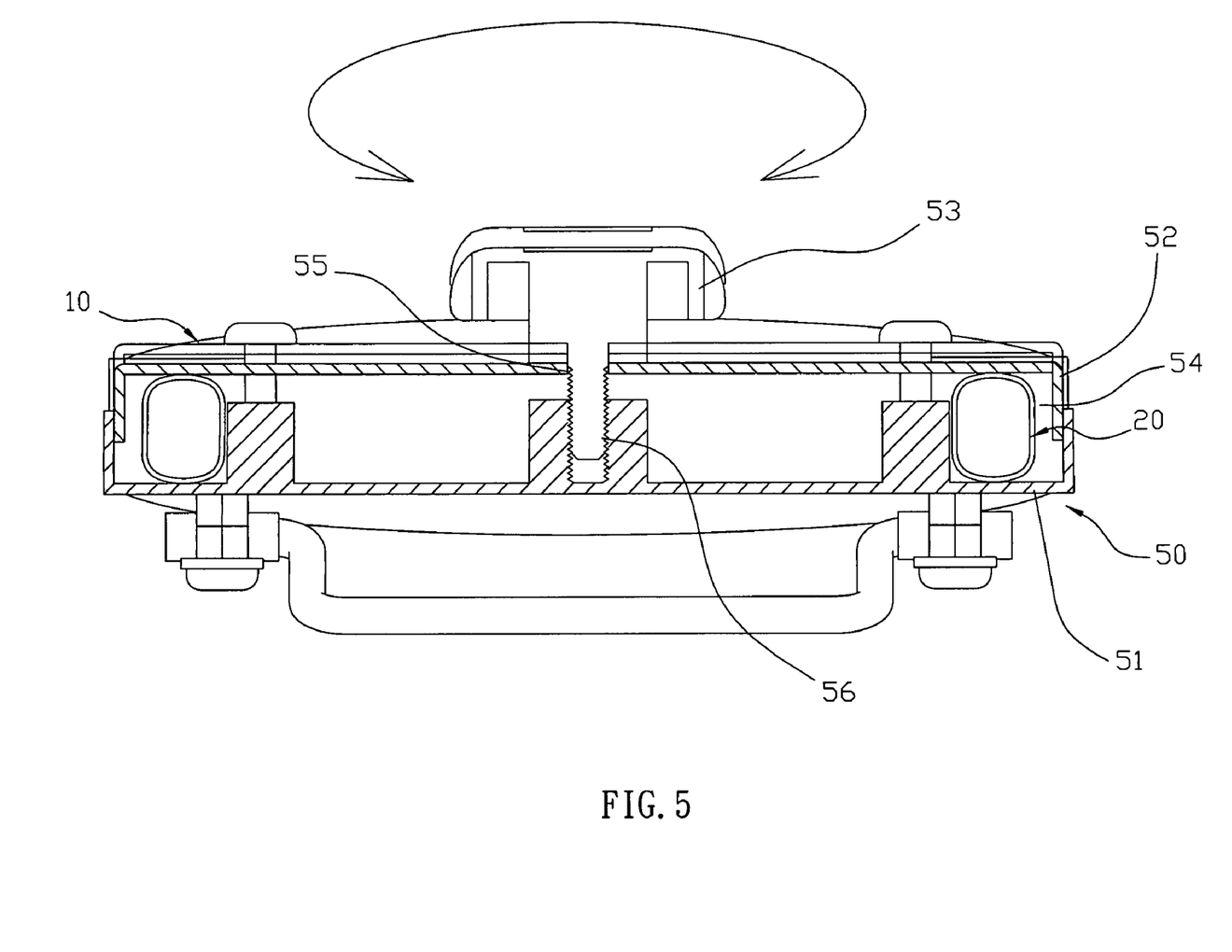
FIG. 5 is a plan cross-sectional view of the handcart as shown in FIG. 1.
Figure 8:
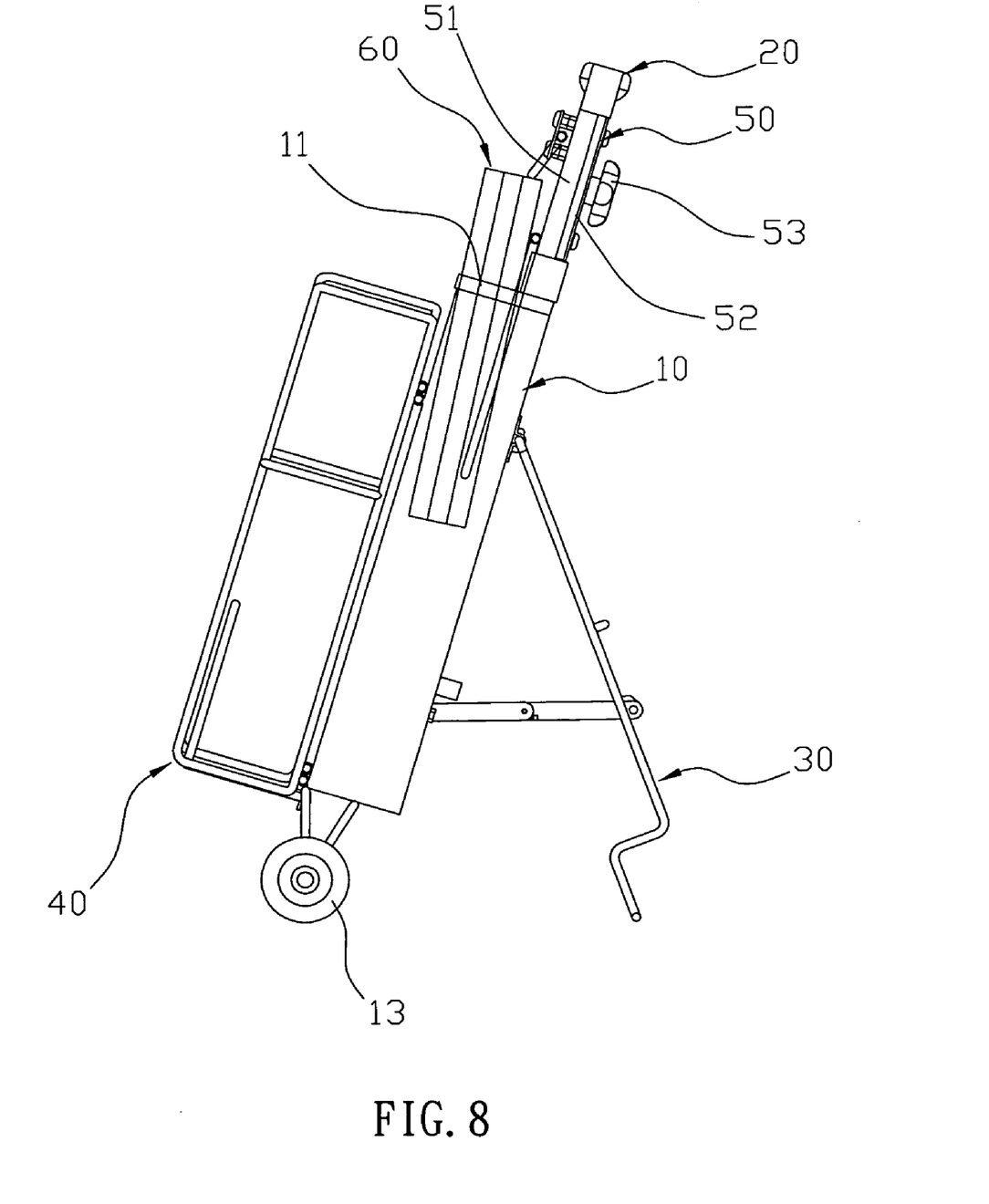
FIG. 8 is a schematic side plan operational view of the handcart as shown in FIG. 1.

The support stand 30 has a fixed end pivotally mounted on the main body 10 and a movable end detachably secured to the main body 10 by a clamping member 31 mounted on the second side of the main body 10. Thus, when the movable end of the support stand 30 is moved outward, the support stand 30 is disposed at an inclined state to support the main body 10 as shown in FIGS. 3 and 4, and when the movable end of the support stand 30 is secured to the main body 10 by the clamping member 31, the support stand 30 is folded into the main body 10 as shown in FIG. 8.

The basket assembly 40 includes a lower support bracket 41 mounted on a lower portion of the main body 10, two opposite side support brackets 42 each retractably mounted on the main body 10, and an elastic strap 44 mounted between the lower support bracket 41 and the two side support brackets 42 to provide an elastic restoring effect to the two side support brackets 42. Each of the two side support brackets 42 has a plurality of transverse movable rods 43 each movably mounted on a respective one of the mounting tubes 12 of the main body 10.

The adjusting seat 50 includes a first clamping plate 51 movably mounted on the handle assembly 20, a second clamping plate 52 movably mounted on the handle assembly 20 and combined with the first clamping plate 51 to cover the handle assembly 20, and a screw member 53 extended through the second clamping plate 52 and secured to the first clamping plate 51 to force the first clamping plate 51 and the second clamping plate 52 to clamp or loosen the handle assembly 20. Each of the first clamping plate 51 and the second clamping plate 52 has two ends each formed with a guide track 54 mounted on the handle assembly 20 to guide movement of each of the first clamping plate 51 and the second clamping plate 52. The screw member 53 is rotatably mounted on the second clamping plate 52 and extended through a through hole 55 of the second clamping plate 52 and screwed into a screw bore 56 of the first clamping plate 51. Thus, when the screw member 53 is loosened, the adjusting seat 50 is movable on the handle assembly 20, and when the screw member 53 is tightened, the adjusting seat 50 is fixed on the handle assembly 20.

The table 60 includes a fixed table face 61 pivotally mounted on the second clamping plate 52 of the adjusting seat 50, two movable table faces 62 pivotally mounted on two opposite sides of the fixed table face 61, and a support bracket 63 having a first portion pivotally mounted on the second clamping plate 52 of the adjusting seat 50 and a second portion pivotally mounted on a bottom of the fixed table face 61 and detachably locked on the fixed table face 61 by a locking member 64.

As shown in FIGS. 1-5, the handle assembly 20 is expanded outward from the main body 10, the adjusting seat 50 is adjustably mounted on the handle assembly 20 by the screw member 53 to adjust the height of the table 60, the table 60 is fully expanded and supported by the support bracket 63, and the support stand 30 is disposed at an inclined state to support the main body 10.

Figure 6:
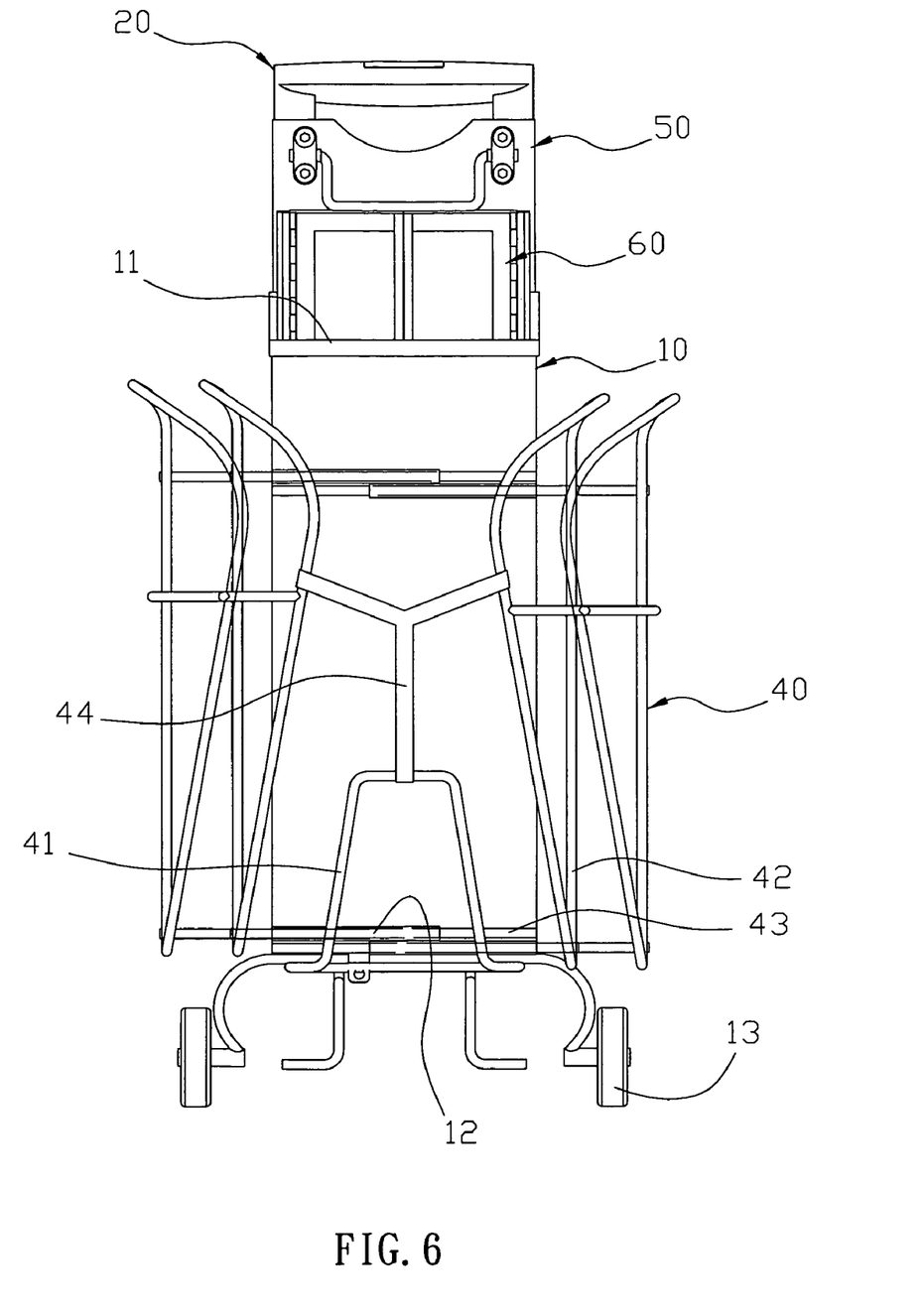
FIG. 6 is a schematic front plan operational view of the handcart as shown in FIG. 1.

As shown in FIG. 6, the two side support brackets 42 are expanded outward to increase the width of the basket assembly 40 for placing a larger article and limited by the elastic strap 44.

Figure 7:
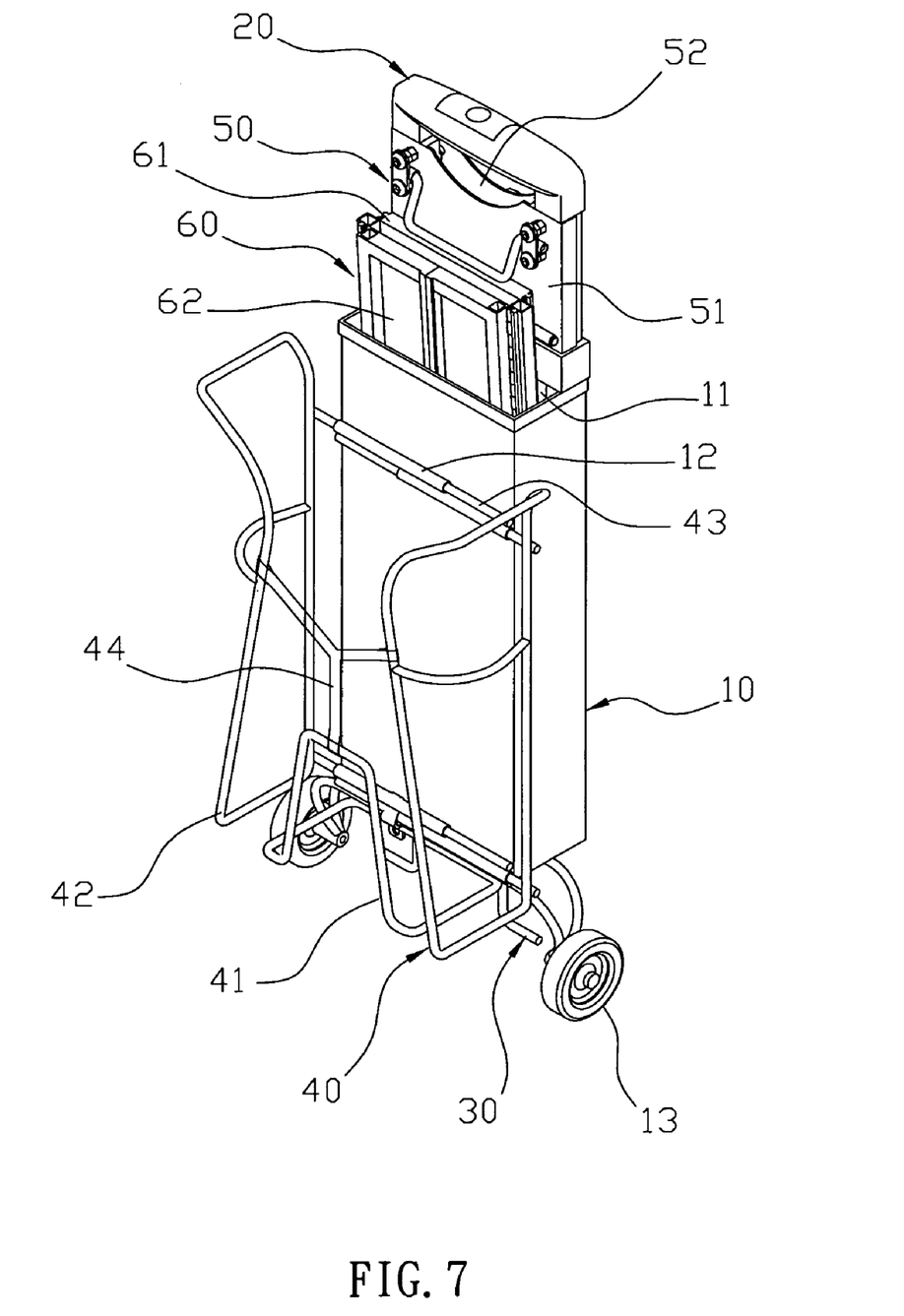
FIG. 7 is a schematic perspective operational view of the handcart as shown in FIG. 1.

As shown in FIGS. 7 and 8, the table 60 is folded, and the handle assembly 20 is retracted into the main body 10, so that the table 60, the adjusting seat 50 and the handle assembly 20 are folded onto the main body 10.

Figure 9:
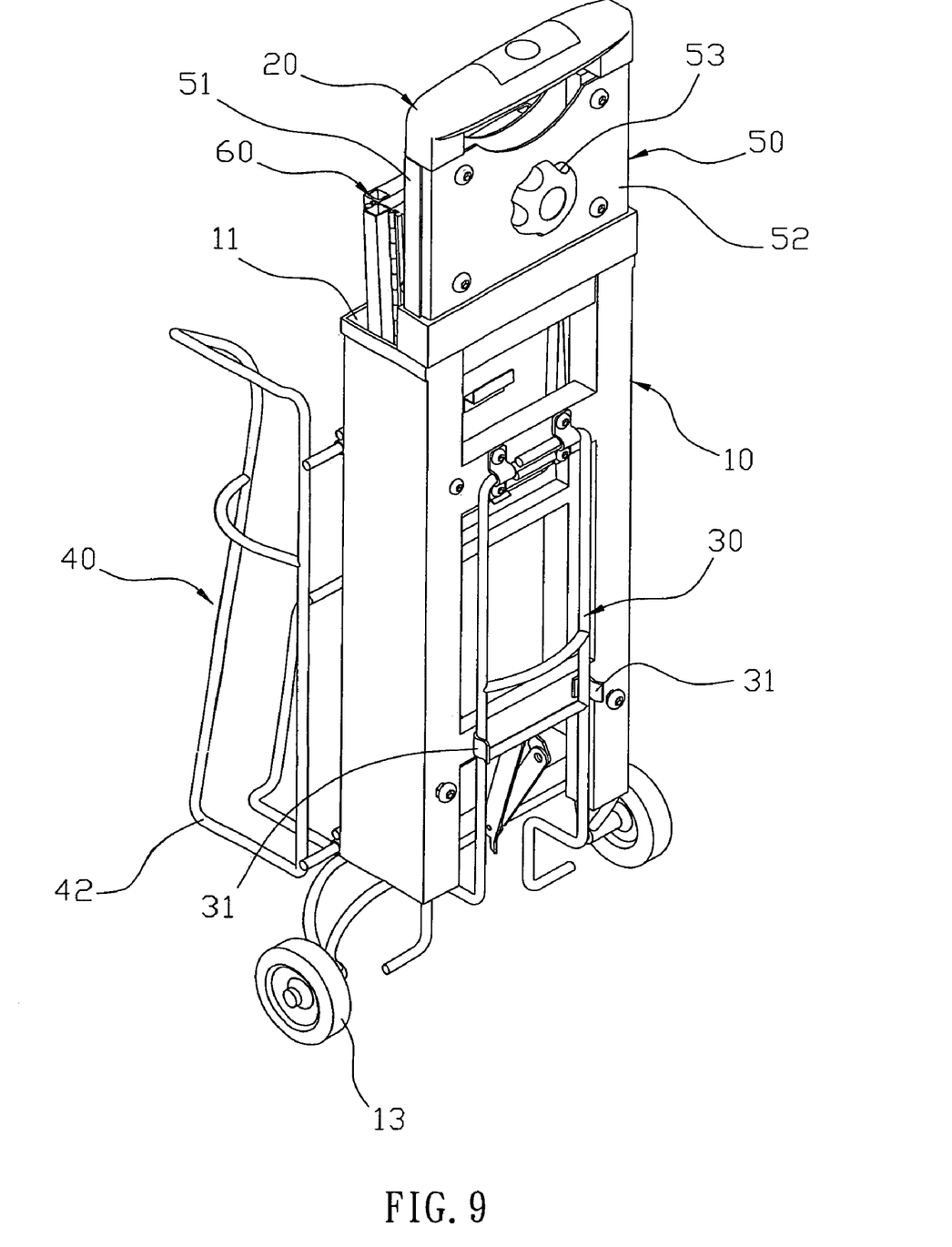
FIG. 9 is a schematic perspective operational view of the handcart as shown in FIG. 2.

As shown in FIG. 9, the support stand 30 is folded into the main body.

Accordingly, the table 60 is fully expanded to place an article, such as a notebook computer, so that a user can operate notebook computer easily and conveniently. In addition, the adjusting seat 50 is adjustably mounted on the handle assembly 20 by the screw member 53 to adjust the height of the table 60 so as to fit users of different statures. Further, the two side support brackets 42 are expanded outward to increase the width of the basket assembly 40 for placing an article having a larger size. Further, the support stand 30 is disposed at an inclined state to support the main body 10 and folded into the main body when not in use, thereby facilitating the user operating the handcart.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A handcart, comprising:
a main body;
a telescopically arranged handle assembly retractably mounted on the main body;
an adjusting seat adjustably mounted on the handle assembly;
a foldable table pivotally mounted on the adjusting seat;
wherein the main body has an inside formed with a receiving chamber for receiving the handle assembly and the table.

2. The handcart in accordance with claim 1, wherein the handle assembly is retractably mounted in and expanded outward from the receiving chamber of the main body.

3. The handcart in accordance with claim 1, wherein the adjusting seat includes a first clamping plate movably mounted on the handle assembly, a second clamping plate movably mounted on the handle assembly and combined with the first clamping plate to cover the handle assembly, and a screw member extended through the second clamping plate and secured to the first clamping plate to force the first clamping plate and the second clamping plate to clamp or loosen the handle assembly.

4. The handcart in accordance with claim 3, wherein each of the first clamping plate and the second clamping plate has two ends each formed with a guide track mounted on the handle assembly to guide movement of each of the first clamping plate and the second clamping plate.

5. The handcart in accordance with claim 3, wherein the screw member is rotatably mounted on the second clamping plate and extended through a through hole of the second clamping plate and screwed into a screw bore of the first clamping plate.

6. The handcart in accordance with claim 3, wherein the adjusting seat is movable on the handle assembly when the screw member is loosened.

7. The handcart in accordance with claim 3, wherein the adjusting seat is fixed on the handle assembly when the screw member is tightened.

8. A handcart, comprising:
a main body;
a telescopically arranged handle assembly retractable mounted on the main body;
an adjusting seat adjustably mounted on the handle assembly;
a foldable table pivotally mounted on the adjusting seat;
wherein the table includes a fixed table face pivotally mounted on the adjusting seat, two movable table faces pivotally mounted on two opposite sides of the fixed table face, and a support bracket having a first portion pivotally mounted on the adjusting seat and a second portion pivotally mounted on a bottom of the fixed table face and detachably locked on the fixed table face by a locking member.

9. A handcart, comprising:
a main body;
a telescopically arranged handle assembly retractably mounted on the main body;
an adjusting seat adjustable mounted on the handle assembly;
a foldable table pivotally mounted on the adjusting seat;
a basket assembly mounted on a first side of the main body;
wherein the basket assembly includes a lower support bracket mounted on a lower portion of the main body, two opposite side support brackets each retractably mounted on the main body, and an elastic strap mounted between the lower support bracket and the two side support brackets to provide an elastic restoring effect to the two side support brackets.

10. The handcart in accordance with claim 9, wherein the first side of the main body is provided with a plurality of transverse mounting tubes, and each of the two side support brackets has a plurality of transverse movable rods each movably mounted on a respective one of the mounting tubes of the main body.

11. The handcart in accordance with claim 9, further comprising a support stand mounted on a second side of the main body.

12. The handcart in accordance with claim 11, wherein the support stand has a fixed end pivotally mounted on the main body and a movable end detachably secured to the main body by a clamping member mounted on the second side of the main body.

13. The handcart in accordance with claim 12, wherein the support stand is disposed at an inclined state to support the main body when the movable end of the support stand is moved outward.

14. The handcart in accordance with claim 12, wherein the support stand is folded into the main body when the movable end of the support stand is secured to the main body by the clamping member.

15. The handcart in accordance with claim 1, further comprising a plurality of wheels rotatably mounted on a bottom of the main body.

* * * * *